US006458873B1

(12) United States Patent
DePorter

(10) Patent No.: US 6,458,873 B1
(45) Date of Patent: Oct. 1, 2002

(54) POLYOLEFIN COMPOSITIONS

(75) Inventor: JoEllen K. DePorter, Seabrook, TX (US)

(73) Assignee: Phillips Petroleum Company, Bartlesville, OK (US)

( * ) Notice: Subject to any disclaimer, the term of this patent is extended or adjusted under 35 U.S.C. 154(b) by 0 days.

(21) Appl. No.: 08/433,008

(22) Filed: May 3, 1995

(51) Int. Cl.$^7$ .................................................. C08K 5/15
(52) U.S. Cl. ...................................................... 524/108
(58) Field of Search ........................................ 524/108

(56) References Cited

U.S. PATENT DOCUMENTS

| | | | |
|---|---|---|---|
| 3,207,735 A | 9/1965 | Wijga .......................... 260/93.7 |
| 3,207,737 A | 9/1965 | Wales .......................... 260/93.7 |
| 3,207,738 A | 9/1965 | Wijga .......................... 260/93.7 |
| 3,299,029 A | 1/1967 | Binsbergen et al. ........ 260/93.7 |
| 3,721,682 A | 3/1973 | Murai et al. ............... 260/340.7 |
| 3,944,530 A | 3/1976 | Sugita et al. .............. 260/88.25 |
| 3,966,845 A | 6/1976 | Van Brederode et al. ....................... 260/876 R |
| 4,016,118 A | 4/1977 | Hamada et al. ....... 260/17.4 SG |
| 4,131,612 A | 12/1978 | Uchiyama ................. 260/340.7 |
| 4,211,852 A | 7/1980 | Matsuda et al. ............. 525/240 |
| 4,219,570 A | 8/1980 | Inazuka et al. .............. 424/343 |
| 4,419,473 A | 12/1983 | Maheffey. Jr. .............. 524/104 |
| 4,460,445 A | 7/1984 | Rekers ..................... 204/159.2 |
| 4,562,265 A | 12/1985 | Machell ....................... 549/364 |
| 4,611,024 A | 9/1986 | Wolfe ........................... 524/366 |
| 4,726,989 A | 2/1988 | Mrozinski ................. 428/315.5 |
| 4,885,162 A | 12/1989 | Kawai et al. ................... 424/83 |
| 5,001,176 A * | 3/1991 | Nakazima .................... 524/108 |
| 5,049,605 A | 9/1991 | Rekers ........................ 524/108 |
| 5,198,484 A | 3/1993 | Mannion ..................... 524/108 |
| 5,200,174 A | 4/1993 | Gardlik et al. ................. 424/66 |
| 5,286,755 A | 2/1994 | Kauffmann et al. ......... 514/944 |

OTHER PUBLICATIONS

C. Carroll, *A nucleating agent for crystalline olefinic polymers* Modern Plastics, pp. 108–112, (Sep. 1984).

I. Rubin, *Injection Molding Theory and Practice* John Wiley & Sons, Inc., New York, pp. 190–196 (1972).

* cited by examiner

*Primary Examiner*—Peter D. Mulcahy

(57) ABSTRACT

A polyolefin composition is provided that has an improved impact strength. Additionally, a process of using dibenzylidene sorbitol to improve the impact strength of a polyolefin is provided. Said polyolefin composition comprises: (a) a polyolefin that comprises ethylene, wherein said polyolefin has a melt index from about 3 to about 10 grams per ten minutes and a density greater than 0.938 grams per cubic centimeter and wherein said polyolefin that comprises ethylene is a homopolymer or a copolymer, where said copolymer comprises ethylene as the major component, as measured by mole percent, of said copolymer; and (b) dibenzylidene sorbitol, in an amount equal to, or greater than, the amount required to increase the notch izod impact strength of a composition that consists essentially of said polyolefin and said dibenzylidene sorbitol, by greater than 10 percent over the notched izod impact strength of a composition that consists essentially of said polyolefin.

48 Claims, No Drawings

POLYOLEFIN COMPOSITIONS

This invention is related to the field of compositions that comprise polyolefins that comprise ethylene.

BACKGROUND

Changes in the density, molecular weight, or molecular weight distribution of a polyolefin that comprises ethylene can noticeably affect its physical properties. For example, the impact strength of an article made from such a polyolefin will decrease, if that article is made using another polyolefin that has either a higher density, a lower molecular weight, or a broader molecular weight distribution, other factors being equal. Conversely, the impact strength of an article made from such a polyolefin will increase, if that article is made using another polyolefin that has either a lower density, a higher molecular weight, or a narrower molecular weight distribution, other factors being equal.

Certain polyolefins that comprise ethylene can be injection molded. These injection-moldable polyolefins typically have melt indices from about 5 to about 100 grams per 10 minutes. An injection-moldable polyolefin that has a melt index lower than another injection-moldable polyolefin, will have a higher impact strength, however, such a polyolefin will be harder to process through an injection-molding apparatus, other factors being equal. Additionally, injection-moldable polyolefins typically have molecular weight distributions from about 2 to about 35. An injection-moldable polyolefin that has a narrower molecular weight distribution than another injection-moldable polyolefin, will have a higher impact strength, however, such a polyolefin will be harder to process through an injection-molding apparatus, other factors being equal.

It has long been desirable to produce polyolefins that comprise ethylene where such polyolefins have better impact strength. This is because less polyolefin would be needed to produce a product that has an impact strength similar to a product made using a polyolefin having a lower impact strength.

SUMMARY

It is an object of this invention to provide a polyolefin composition that has an improved impact strength.

It is another object of this invention to provide a process to improve the impact strength of a polyolefin composition.

These and other objects of the invention will become better understood with reference to the following description, examples, and claims.

In accordance with this invention a polyolefin composition is provided that has an improved impact strength. This polyolefin composition comprises (or optionally consists essentially of, or consists of):

(a) a polyolefin that comprises (or optionally consists essentially of, or consists of) ethylene, wherein said polyolefin has a melt index from about 3 to about 10 grams per ten minutes and a density greater than 0.938 grams per cubic centimeter; and (b) dibenzylidene sorbitol, in an amount equal to, or greater than, the amount required to increase the notched izod impact strength of a composition that consists essentially of said polyolefin and said dibenzylidene sorbitol, by greater than about 10 percent over the notched izod impact strength of a composition that consists essentially of said polyolefin.

In accordance with this invention a polyolefin composition is provided that has an improved impact strength. This polyolefin composition comprises (or optionally consists essentially of, or consists of):

(a) a polyolefin that comprises (or optionally consists essentially of, or consists of) ethylene, wherein said polyolefin has a melt index from about 3 to about 10 grams per ten minutes and a density greater than 0.938 grams per cubic centimeter; and (b) dibenzylidene sorbitol, in an amount from about 50 to about 50000 parts per million by weight of said polyolefin.

In accordance with this invention a process of using dibenzylidene sorbitol to improve the impact strength of a polyolefin is provided. This process comprises (or optionally consists essentially of, or consists of) contacting:

(a) a polyolefin that comprises (or optionally consists essentially of, or consists of) ethylene, wherein said polyolefin has a melt index from about 3 to about 10 grams per ten minutes and a density greater than 0.938 grams per cubic centimeter; and (b) dibenzylidene sorbitol, in an amount equal to, or greater than, the amount required to increase the notched izod impact strength of a composition that consists essentially of said polyolefin and said dibenzylidene sorbitol, by greater than about 10 percent over the notched izod impact strength of a composition that consists essentially of said polyolefin.

In accordance with this invention a process of using dibenzylidene sorbitol to improve the impact strength of a polyolefin is provided. This process comprises (or optionally consists essentially of, or consists of) contacting:

(a) a polyolefin that comprises (or optionally consists essentially of, or consists of) ethylene, wherein said polyolefin has a melt index from about 3 to about 10 grams per ten minutes and a density greater than 0.938 grams per cubic centimeter; and (b) dibenzylidene sorbitol, in an amount from about 50 to about 50000 parts per million by weight of said polyolefin.

DETAILED DESCRIPTION OF THE INVENTION

In general, the polyolefin compositions of this invention comprise a polyolefin and dibenzylidene sorbitol.

The polyolefins that can be used in this invention comprise ethylene. That is, they can be either homopolymers or copolymers. If the polyolefin used is a copolymer, ethylene should be the major component, as measured by mole percent, of the copolymer. It is preferred if the comonomer in the copolymer is an alpha-olefin having from 3 to 20 carbon atoms in its molecular structure. It is more preferred if the comonomer is selected from the group consisting of propylene, 1-butene, 3-methyl-1-butene, 1-pentene, 3-methyl-1-pentene, 4-methyl-1-pentene, 1-hexene, 3-ethyl-1-hexene, 1-heptene, 1-octene, 1-nonene, 1-decene, and mixtures thereof.

The densities of these polyolefins should be greater than 0.938 grams per cubic centimeter as measured in accordance with ASTM D1505 This is because dibenzylidene sorbitol is not as useful in improving the impact strength of polyolefins that have densities critically lower than 0.938 grams per cubic centimeter. However, It is preferred if the densities of these polyolefins are in the range of about 0.94 to about 0.98 grams per cubic centimeter. This because dibenzylidene sorbitol is more useful in improving the impact strength of polyolefins that have densities in this range.

The melt indices of these polyolefins should be in the range of about 3 to about 10 grams per ten minutes as measured in accordance with ASTM D1238(190/2.16). This is because dibenzylidene sorbitol is not as useful in improving the impact strength of polyolefins that have melt indices critically lower than about 3 or critically higher than about 10 grams per ten minutes. However, it is preferred if the melt indices of these polyolefins are in the range of about 4 to about 9 grams per 10 minutes. This is because dibenzylidene sorbitol is more useful in improving the impact strength of polyolefins that have melt indices in this range.

The molecular weight distribution should be in the range of about 2 to about 8. However, higher and lower molecular weight distributions may be used.

These types of polyolefins can be made by any method know in the art. For example, chromium oxide catalysts, titanium halide catalysts, and transition-metal metallocene catalysts can be used to make these types of polyolefins. All of these catalysts are known in the art and the processes for making these polyolefins using these catalysts are also known in the art.

There are several processes known in the art to make dibenzylidene sorbitol. The structure of dibenzylidene sorbitol is as follows:

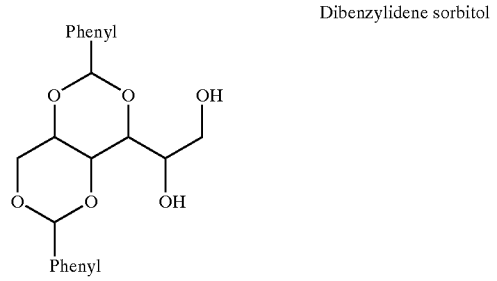

Dibenzylidene sorbitol

The amount of dibenzylidene sorbitol to contact with a polyolefin, is an amount equal to, or greater than, the amount required to increase the notched izod impact strength of a composition that consists essentially of said polyolefin and said dibenzylidene sorbitol, by greater than about 10 percent over the notched izod impact strength of a composition that consists essentially of said polyolefin. The notched izod impact strengths are measured in accordance with ASTM method D256-90b using injection molded test specimens. However, it is preferred if the amount is equal to, or greater than, the amount required to increase the notched izod impact strength of a composition that consists essentially of said polyolefin and said dibenzylidene sorbitol, by greater than about 30 percent over the notched izod impact strength of a composition that consists essentially of said polyolefin. However, it is even more preferred if the amount is equal to, or greater than, the amount required to increase the notched izod impact strength of a composition that consists essentially of said polyolefin and said dibenzylidene sorbitol, by greater than about 70 percent over the notched izod impact strength of a composition that consists essentially of said polyolefin.

Usually, the amount of dibenzylidene sorbitol to contact with a polyolefin is from about 50 to about 50000 parts per million by weight of said polyolefin. However, in most cases, it is preferred if the amount of dibenzylidene sorbitol contacted with a polyolefin is from about 250 to about 25000 parts per million by weight said polyolefin. Furthermore, it is more preferred if the amount of dibenzylidene sorbitol contacted with a polyolefin is from about 1000 to about 10000 parts per million by weight said polyolefin.

If the amount contacted with a polyolefin is too low, then the impact strength of said polyolefin will not be substantially increased. However, if the amount contacted with a polyolefin is too high, then the other physical properties of said polyolefin may be adversely affected.

Dibenzylidene sorbitol and a polyolefin can be contacted together by any manner known in the art that intimately blends these two components together. For example, a polyolefin and dibenzylidene sorbitol can be combined together and extruded into a suitable form. As an additional example, dibenzylidene sorbitol can be mixed with a suitable carrier and then blended with a polyolefin in any manner known in the art.

EXAMPLES

These examples are provided to further assist a person skilled in the art with understanding this invention. The particular compositions, conditions, and the like, are intended to be generally illustrative of this invention and are not meant to be construed as unduly limiting the reasonable scope of this invention.

The polyolefins that were used were obtained from the Phillips Petroleum Company. The nucleating agent was introduced either by combining it with polyolefin fluff and extruding into pellets or by coating polyolefin pellets with a 1:20 weight ratio of the nucleating agent with mineral spirits. In either case, nucleated pellets were molded into test specimens. Polyolefin fluff pelletization was accomplished using a Davis Standard 2.5" compounding extruder with a single stage screw, a screw speed of 100 rpm, a throughput rate of approximately 185 lb./hr., torque at approximately 45% of maximum, a product melt temperature of approximately 210° C. and a ten-zone tapered barrel temperature ranging from approximately 177° C. at the input end to approximately 204° C. at the output end. Test specimens were injection molded from the pellets. Test bars for ASTM physical property testing were molded using a 125 ton machine with nozzle and barrel temperatures set at 218° C. and mold temperature set at 38° C. Injection rate was 40% with 50 psi back pressure, 40 second mold closed time, 1 second mold open time and 0.2 second decompression time. Five-gallon test pails were molded using a 500 ton machine with the nozzle and the first two barrel zones set at 232° and the third zone set at 221° C. The mold temperature was set at 10° C. for the core and cavity and 32° C. for the sprue bushing. Injection rate was near maximum with a back pressure of 125 psi, a mold closed time of 25 seconds, a mold open time of 1 second and a decompression time of 0.6 second. Two sets of test pails were molded from each test sample. One set was molded using a stock temperature of 260° C. while a second set used a stock temperature of 316° C. The melt indexes of the samples, as pellets, were measured according to ASTM method D1238 (190/2.16). The densities were measured according to ASTM method D1505 using molded samples that were prepared using ASTM method D1248. Notched Izod impact values were obtained according to ASTM method D256-90b using injection molded test specimens. Drop impact testing was performed on five gallon injection molded pails. The pails are filled with water and covered with a lid. The pails are dropped onto a concrete floor from measured heights. By testing a minimum of ten pails, the average height just sufficient to cause failure is determined. The results of the various testing are shown in the tables which follow.

TABLE 1

Compositions that comprise polyolefins that comprise ethylene

| SAMPLE* | LEVEL** | MELT INDEX g/10 MIN. | DENSITY, g/cc | NOTCHED IZOD, ft. lb./in. |
|---|---|---|---|---|
| a1 | 0 | 0.18 | 0.923 | No Break |
| a2 | 5000 | 0.18 | 0.923 | No Break |
| b1 | 0 | 0.35 | 0.955 | 3.9 |
| b2 | 5000 | 0.35 | 0.955 | 2.4 |
| c1 | 0 | 0.70 | 0.960 | 2.4 |
| c2 | 5000 | 0.70 | 0.960 | 1.3 |
| d1 | 0 | 2.9 | 0.938 | No Break |
| d2 | 5000 | 2.9 | 0.938 | No Break |
| e1 | 0 | 5.0 | 0.945 | 3.5 |
| e2 | 5000 | 5.0 | 0.945 | 6.0 |
| f1 | 0 | 4.8 | 0.963 | 2.1 |
| f2 | 2000 | 4.8 | 0.963 | 2.4 |
| f3 | 5000 | 4.8 | 0.963 | No Break |
| g1 | 0 | 6.6 | 0.961 | 1.5 |
| g2 | 500 | 6.6 | 0.961 | 1.9 |
| g3 | 5000 | 6.6 | 0.961 | No Break |
| h1 | 0 | 8.4 | 0.963 | 1.3 |
| h2 | 1000 | 8.4 | 0.963 | 1.4 |
| h3 | 2000 | 8.4 | 0.963 | 1.2 |
| h4 | 5000 | 8.4 | 0.963 | 2.0 |
| i1 | 0 | 64 | 0.953 | 0.53 |
| i2 | 500 | 64 | 0.953 | 0.57 |
| i3 | 2500 | 64 | 0.953 | 0.59 |
| i4 | 5000 | 64 | 0.953 | 0.54 |

*Samples with a common letter designation are from the same sample of polyethylene. The different numbers used with a letter indicate differing levels of added dibenzylidene sorbitol.
**The level is in parts per million by weight. The additive is dibenzylidene sorbitol, such as Millad 3905 available from Milliken Chemical.

The data in Table 1 indicate that it is necessary for the melt index of a polyolefin that comprises ethylene to be in the range of about 3 to about 10 g/10 minutes for dibenzylidene sorbitol to be effective in significantly improving the notched Izod impact strength of said polyolefin.

TABLE 2

Other Nucleating Agents

| SAMPLE* | AGENT | LEVEL, PPM | NOTCHED IZOD, ft. lb./in. |
|---|---|---|---|
| j1 | Sodium Benzoate | 0 | 2.4 |
| j2 | Sodium Benzoate | 500 | 2.4 |
| j3 | Sodium Benzoate | 1000 | 2.3 |
| j4 | Sodium Benzoate | 2000 | 2.4 |
| j5 | Sodium Benzoate | 5000 | 2.2 |
| k1 | Potassium Stearate | 0 | 1.4 |
| k2 | Potassium Stearate | 1000 | 1.5 |
| k3 | Potassium Stearate | 2500 | 1.5 |
| k4 | Potassium Stearate | 5000 | 1.4 |

*The j series of samples used the same lot of the same type of polyolefin as was used in the f series of samples in Table 1. The k series of samples used the same type of polyolefin (but not the same lot) as was used in the g series of samples in Table 1.

The data in Table 2, when viewed in conjunction with the data in Table 1, show that dibenzylidene sorbitol is effective in increasing the notched Izod impact strength of certain polyolefins while sodium benzoate and potassium stearate are not.

As a measure of lot variation of a particular type of polyethylene and as a measure of data variation between samples prepared and tested as different times, the f series of Table 1 was repeated with the following differences: (1) A different lot of polyolefin was used for the sample containing no added dibenzylidene sorbitol and (2) using the same lot of polyethylene as was used for the 2000 and 5000 ppm dibenzylidene sorbitol samples of the f series of Table 1, different samples were prepared and tested. The results are shown in Table 3, below.

TABLE 3

Data Variation Among Lots and Samples

| SAMPLE | LEVEL* | NOTCHED IZOD, ft. lb./in. |
|---|---|---|
| 11 | 0 | 1.9 |
| 12 | 2000 | 2.4 |
| 13 | 5000 | No Break |

*Level, in ppm, of added dibenzylidene sorbitol.

The data in Table 3, taken with the corresponding data (f series) in Table 1, indicate that there is very little variation in results among lots of a given polyolefin and that there is no measurable difference in results among samples prepared and tested from the same lot of polyolefin at different times.

TABLE 4

Impact Test Method

| SAMPLE* | LEVEL** | DROP IMPACT, ft. (260 c/316° C.)*** | NOTCHED IZOD, ft. lb./in. |
|---|---|---|---|
| m1 | 0 | 30/30 | 1.8 |
| n1 | 500 | 30/30 | 1.8 |
| n2 | 5000 | 28/28 | No Break |

*The polyolefin used for sample m1 was of the same type as that used for the f series of samples in Table 1. The polyolefin used for samples n1 and n2 was the same type as used for the g series of samples in Table 1.
**Level, in parts per million by weight of said polyolefin, of added dibenzylidene sorbitol.
***These are the results of the drop impact test on five gallon pails described previously. the designation in parentheses indicates the stock temperature at which the pails were molded.

The data in Table 4 indicates that while a sufficient level of added dibenzylidene sorbitol can have a marked effect on the notched Izod impact strength of certain polyolefins, this effect is apparently not reflected in the stop impact strength of injection molded pails. This may indicate that the effect of the invention is to reduce the notch sensitivity of molded specimens to impact, thus minimizing the detrimental effect on impact of scratches or other injuries and allowing part designs with areas of greater stress concentration than would otherwise be possible.

Although the present invention has been described in considerable detail with reference to certain preferred versions thereof, other versions are possible. Therefore, the spirit and scope of the claims should not be limited to the description of the preferred versions contained herein.

What is claimed is:

1. A polyolefin composition that comprises:
   (a) a polyolefin that comprises ethylene, wherein said polyolefin has a melt index from about 3 to about 10 grams per ten minutes as measured in accordance with ASTM D1238 (190/2.16), and a density greater than 0.938 grams per cubic centimeter as measured in accordance with ASTM 1505, and wherein said polyolefin that comprises ethylene is a homopolymer or a copolymer, where said copolymer comprises ethylene as the major component, as measured by mole percent, of said copolymer; and (b) dibenzylidene sorbitol, in an amount equal to, or greater than, the amount required to increase the notch izod impact strength of a composition that consists essentially of said polyolefin and said dibenzylidene sorbitol, by greater than 10 percent over the notched izod impact strength of a composition that consists essentially of said polyolefin, where said notch izod impact strengths are measured in accordance with ASTM D256-90b.

2. A polyolefin composition according to claim 1 wherein said polyolefin has a melt index from about 4 to about 9 grams per 10 minutes and a density from about 0.94 to about 0.98 grams per cubic centimeter.

3. A polyolefin composition according to claim 2 wherein said amount of dibenzylidene sorbitol is equal to, or greater than, the amount required to increase the notched izod impact strength of a composition that consists essentially of said polyolefin and said dibenzylidene sorbitol, by greater than about 30 percent over the notched izod impact strength of a composition that consists essentially of said polyolefin, where said notch izod impact strengths are measured in accordance with ASTM D256-90b.

4. A polyolefin composition according to claim 3 wherein said amount of dibenzylidene sorbitol is equal to, or greater than, the amount required to increase the notched izod impact strength of a composition that consists essentially of said polyolefin and said dibenzylidene sorbitol, by greater than about 70 percent over the notched izod impact strength of a composition that consists essentially of said polyolefin, where said notch izod impact strengths are measured in accordance with ASTM D256-90b.

5. A polyolefin composition according to claim 1 wherein said polyolefin consists essentially of ethylene and a comonomer selected from the group consisting of propylene, 1-butene, 3-methyl-1-butene, 1-pentene, 3-methyl-1-pentene, 4-methyl-1-pentene, 1-hexene, 3-ethyl-1-hexene, 1-heptene, 1-octene, 1-nonene, 1-decene, and mixtures thereof.

6. A polyolefin composition according to claim 5 wherein said polyolefin has a melt index from about 4 to about 9 grams per 10 minutes and a density from about 0.94 to about 0.96 grams per cubic centimeter.

7. A polyolefin composition according to claim 6 wherein said amount of dibenzylidene sorbitol is equal to, or greater than, the amount required to increase the notched izod impact strength of a composition that consists essentially of said polyolefin and said dibenzylidene sorbitol, by greater than about 30 percent over the notched izod impact strength of a composition that consists essentially of said polyolefin, where said notch izod impact strengths are measured in accordance with ASTM D256-90b.

8. A polyolefin composition according to claim 7 wherein said amount of dibenzylidene sorbitol is equal to, or greater than, the amount required to increase the notched izod impact strength of a composition that consists essentially of said polyolefin and said dibenzylidene sorbitol, by greater than about 70 percent over the notched izod impact strength of a composition that consists essentially of said polyolefin, where said notch izod impact strengths are measured in accordance with ASTM D256-90b.

9. A polyolefin composition according to claim 1 wherein said polyolefin consists of ethylene.

10. A polyolefin composition according to claim 9 wherein said polyolefin has a melt index from about 4 to about 9 grams per 10 minutes and a density from about 0.96 to about 0.98 grams per cubic centimeter.

11. A polyolefin composition according to claim 10 wherein said amount of dibenzylidene sorbitol is equal to, or greater than, the amount required to increase the notched izod impact strength of a composition that consists essentially of said polyolefin and said dibenzylidene sorbitol, by greater than about 30 percent over the notched izod impact strength of a composition that consists essentially of said polyolefin, where said notch izod impact strengths are measured in accordance with ASTM D256-90b.

12. A polyolefin composition according to claim 11 wherein said amount of dibenzylidene sorbitol is equal to, or greater than, the amount required to increase the notched izod impact strength of a composition that consists essentially of said polyolefin and said dibenzylidene sorbitol, by greater than about 70 percent over the notched izod impact strength of a composition that consists essentially of said polyolefin, where said notch izod impact strengths are measured in accordance with ASTM D256-90b.

13. A polyolefin composition that comprises:
(a) a polyolefin that comprises ethylene, wherein said polyolefin has a melt index from about 3 to about 10 grams per ten minutes as measured in accordance with ASTM D1238 (190/2.16), and a density greater than 0.938 grams per cubic centimeter as measured in accordance with ASTM 1505, and wherein said polyolefin that comprises ethylene is a homopolymer or a copolymer, where said copolymer comprises ethylene as the major component, as measured by mole percent, of said copolymer; and
(b) dibenzylidene sorbitol, in an amount from about 50 to about 50000 parts per million by weight of said polyolefin.

14. A polyolefin composition according to claim 13 wherein said polyolefin has a melt index from about 4 to about 9 grams per 10 minutes and a density from about 0.94 to about 0.98 grams per cubic centimeter.

15. A polyolefin composition according to claim 14 wherein said amount of dibenzylidene sorbitol is from about 250 to about 25000 parts per million by weight.

16. A polyolefin composition according to claim 14 wherein said amount of dibenzylidene sorbitol is from about 1000 to about 10000 parts per million by weight.

17. A polyolefin composition according to claim 13 wherein said polyolefin consists essentially of ethylene and a comonomer selected from the group consisting of propylene, 1-butene, 3-methyl-1-butene, 1-pentene, 3-methyl-1-pentene, 4-methyl-1-pentene, 1-hexene, 3-ethyl-1-hexene, 1-heptene, 1-octene, 1-nonene, 1-decene, and mixtures thereof.

18. A polyolefin composition according to claim 17 wherein said polyolefin has a melt index from about 4 to about 9 grams per 10 minutes and a density from about 0.94 to about 0.96 grams per cubic centimeter.

19. A polyolefin composition according to claim 18 wherein said amount of dibenzylidene sorbitol is from about 250 to about 25000 parts per million by weight.

20. A polyolefin composition according to claim 19 wherein said amount of dibenzylidene sorbitol is from about 1000 to about 10000 parts per million by weight.

21. A polyolefin composition according to claim 13 wherein said polyolefin consists of ethylene.

22. A polyolefin composition according to claim 21 wherein said polyolefin has a melt index from about 4 to about 9 grams per 10 minutes and a density from about 0.96 to about 0.98 grams per cubic centimeter.

23. A polyolefin composition according to claim 22 wherein said amount of dibenzylidene sorbitol is from about 250 to about 25000 parts per million by weight.

24. A polyolefin composition according to claim 23 wherein said amount of dibenzylidene sorbitol is from about 1000 to about 10000 parts per million by weight.

25. A process of using dibenzylidene sorbitol to improve the impact strength of a polyolefin said process comprising contacting:
(a) a polyolefin that comprises ethylene, wherein said polyolefin has a melt index from about 3 to about 10 grams per ten minutes as measured in accordance with ASTM D1238 (190/2.16), and a density greater than 0.938 grams per cubic centimeter as measured in accordance with ASTM 1505, and wherein said polyolefin that comprises ethylene is a homopolymer or a copolymer, where said copolymer comprises ethylene as the major component, as measured by mole percent, of said copolymer; and
(b) dibenzylidene sorbitol, in an amount equal to, or greater than, the amount required to increase the notch izod impact strength of a composition that consists essentially of said polyolefin and said dibenzylidene sorbitol, by greater than about 10 percent over the notched izod impact strength of a composition that consists essentially of said polyolefin, where said notch izod impact strengths are measured in accordance with ASTM D256-90b.

26. A process according to claim 25 wherein said polyolefin has a melt index from about 4 to about 9 grams per 10 minutes and a density from about 0.94 to about 0.98 grams per cubic centimeter.

27. A process according to claim 26 wherein said amount of dibenzylidene sorbitol is equal to, or greater than, the amount required to increase the notched izod impact strength of a composition that consists essentially of said polyolefin and said dibenzylidene sorbitol, by greater than about 30 percent over the notched izod impact strength of a composition that consists essentially of said polyolefin, where said notch izod impact strengths are measured in accordance with ASTM D256-90b.

28. A process according to claim 27 wherein said amount of dibenzylidene sorbitol is equal to, or greater than, the amount required to increase the notched izod impact strength of a composition that consists essentially of said polyolefin and said dibenzylidene sorbitol, by greater than about 70 percent over the notched izod impact strength of a composition that consists essentially of said polyolefin, where said notch izod impact strengths are measured in accordance with ASTM D256-90b.

29. A process according to claim 25 wherein said polyolefin consists essentially of ethylene and a comonomer selected from the group consisting of propylene, 1-butene, 3-methyl-1-butene, 1-pentene, 3-methyl-1-pentene, 4-methyl-1-pentene, 1-hexene, 3-ethyl-1-hexene, 1-heptene, 1-octene, 1-nonene, 1-decene, and mixtures thereof.

30. A process according to claim 29 wherein said polyolefin has a melt index from about 4 to about 9 grams per 10 minutes and a density from about 0.94 to about 0.96 grams per cubic centimeter.

31. A process according to claim 30 wherein said amount of dibenzylidene sorbitol is equal to, or greater than, the amount required to increase the notched izod impact strength of a composition that consists essentially of said polyolefin and said dibenzylidene sorbitol, by greater than about 30 percent over the notched izod impact strength of a composition that consists essentially of said polyolefin, where said notch izod impact strengths are measured in accordance with ASTM D256-90b.

32. A process according to claim 31 wherein said amount of dibenzylidene sorbitol is equal to, or greater than, the amount required to increase the notched izod impact strength of a composition that consists essentially of said polyolefin and said dibenzylidene sorbitol, by greater than about 70 percent over the notched izod impact strength of a composition that consists essentially of said polyolefin, where said notch izod impact strengths are measured in accordance with ASTM D256-90b.

33. A process according to claim 25 wherein said polyolefin consists of ethylene.

34. A process according to claim 33 wherein said polyolefin has a melt index from about 4 to about 9 grams per 10 minutes and a density from about 0.96 to about 0.98 grams per cubic centimeter.

35. A process according to claim 34 wherein said amount of dibenzylidene sorbitol is equal to, or greater than, the amount required to increase the notched izod impact strength of a composition that consists essentially of said polyolefin and said dibenzylidene sorbitol, by greater than about 30 percent over the notched izod impact strength of a composition that consists essentially of said polyolefin, where said notch izod impact strengths are measured in accordance with ASTM D256-90b.

36. A process according to claim 35 wherein said amount of dibenzylidene sorbitol is equal to, or greater than, the amount required to increase the notched izod impact strength of a composition that consists essentially of said polyolefin and said dibenzylidene sorbitol, by greater than about 70 percent over the notched izod impact strength of a composition that consists essentially of said polyolefin, where said notch izod impact strengths are measured in accordance with ASTM D256-90b.

37. A process of using dibenzylidene sorbitol to improve the impact strength of a polyolefin said process comprising contacting:
(a) a polyolefin that comprises ethylene, wherein said polyolefin has a melt index from about 3 to about 10 grams per ten minutes as measured in accordance with ASTM D1238 (190/2.16), and a density greater than 0.938 grams per cubic centimeter as measured in accordance with ASTM 1505, and wherein said polyolefin that comprises ethylene is a homopolymer or a copolymer, where said copolymer comprises ethylene as the major component, as measured by mole percent, of said copolymer; and
(b) dibenzylidene sorbitol, in an amount from about 50 to about 50000 parts per million by weight of said polyolefin.

38. A process according to claim 37 wherein said polyolefin has a melt index from about 4 to about 9 grams per 10 minutes and a density from about 0.94 to about 0.98 grams per cubic centimeter.

39. A process according to claim 38 wherein said amount of dibenzylidene sorbitol is from about 250 to about 25000 parts per million by weight.

40. A process according to claim 39 wherein said amount of dibenzylidene sorbitol is from about 1000 to about 10000 parts per million by weight.

41. A process according to claim 37 wherein said polyolefin consists essentially of ethylene and a comonomer selected from the group consisting of propylene, 1-butene, 3-methyl-1-butene, 1-pentene, 3-methyl-1-pentene, 4-methyl-1-pentene, 1-hexene, 3-ethyl-1-hexene, 1-heptene, 1-octene, 1-nonene, 1-decene, and mixtures thereof.

42. A process according to claim 41 wherein said polyolefin has a melt index from about 4 to about 9 grams per 10 minutes and a density from about 0.94 to about 0.96 grams per cubic centimeter.

43. A process according to claim 42 wherein said amount of dibenzylidene sorbitol is from about 250 to about 25000 parts per million by weight.

44. A process according to claim 43 wherein said amount of dibenzylidene sorbitol is from about 1000 to about 10000 parts per million by weight.

45. A process according to claim 37 wherein said polyolefin consists of ethylene.

46. A process according to claim 45 wherein said polyolefin has a melt index from about 4 to about 9 grams per 10 minutes and a density from about 0.96 to about 0.98 grams per cubic centimeter.

47. A process according to claim 46 wherein said amount of dibenzylidene sorbitol is from about 250 to about 25000 parts per million by weight.

48. A process according to claim 47 wherein said amount of dibenzylidene sorbitol is from about 1000 to about 10000 parts per million by weight.

* * * * *